US012725925B2

(12) United States Patent
Chiang et al.

(10) Patent No.: US 12,725,925 B2
(45) Date of Patent: Sep. 1, 2026

(54) ANTENNA STRUCTURE

(71) Applicant: Wistron NeWeb Corp., Hsinchu (TW)

(72) Inventors: Cheng-Wei Chiang, Hsinchu (TW); Jian-Zhong Chen, Hsinchu (TW); Jun-Yan Chen, Hsinchu (TW); Ching-Wen Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 7 days.

(21) Appl. No.: 19/175,198

(22) Filed: Apr. 10, 2025

(65) Prior Publication Data

US 2026/0163235 A1 Jun. 11, 2026

(30) Foreign Application Priority Data

Dec. 9, 2024 (TW) ................................ 113147703

(51) Int. Cl.
*H01Q 5/321* (2015.01)

(52) U.S. Cl.
CPC .................................. *H01Q 5/321* (2015.01)

(58) Field of Classification Search
CPC ...................................................... H01Q 5/321
See application file for complete search history.

(56) References Cited

U.S. PATENT DOCUMENTS

| | | | | |
|---|---|---|---|---|
| 2023/0028988 | A1* | 1/2023 | Li | H01Q 1/24 |
| 2025/0046996 | A1* | 2/2025 | Su | H01Q 5/50 |
| 2025/0112364 | A1* | 4/2025 | Lee | H01Q 5/314 |
| 2026/0058370 | A1* | 2/2026 | Zhang | H01Q 5/385 |
| 2026/0066537 | A1* | 3/2026 | Chang | H01Q 5/357 |
| 2026/0128517 | A1* | 5/2026 | Tseng | H01Q 5/30 |

FOREIGN PATENT DOCUMENTS

| | | | |
|---|---|---|---|
| TW | 202127734 | A | 7/2021 |
| TW | 202433802 | A | 8/2024 |

* cited by examiner

*Primary Examiner* — Hai V Tran
(74) *Attorney, Agent, or Firm* — McClure, Qualey & Rodack, LLP

(57) ABSTRACT

An antenna structure includes the following. A first radiation element has a feeding point. A second radiation element is coupled to the feeding point. A third radiation element is coupled through a capacitive element to the second radiation element. A fourth radiation element is coupled through a tunable circuit to a ground element. The fourth radiation element is adjacent to the first radiation element. A fifth radiation element is coupled to the fourth radiation element. A nonconductive support element has a first surface and a second surface which are opposite to each other. The first radiation element, the second radiation element, the capacitive element, the third radiation element, and the fourth radiation element are disposed on the first surface. The fifth radiation element is disposed on the second surface.

20 Claims, 6 Drawing Sheets

ANTENNA STRUCTURE

CROSS-REFERENCE TO RELATED PATENT APPLICATION

This application claims the benefit of priority to Taiwan Patent Application No. 113147703, filed on Dec. 9, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, in particular to a wideband antenna structure.

BACKGROUND OF THE DISCLOSURE

With the rapid development of mobile communication technology, mobile devices have become increasingly popular in recent years, such as notebook computers, mobile phones, multimedia players, and other portable electronic devices with mixed functions. To meet the demands of users, mobile devices are generally equipped with wireless communication functions. Some of these functions cover long-range wireless communication, such as mobile phones using 2G, 3G, and Long Term Evolution (LTE) systems that communicate within frequency bands including 700 MHz, 850 MHz, 900 MHz, 1800 MHz, 1900 MHz, 2100 MHz, 2300 MHz, and 2500 MHz. Others cover short-range wireless communication, such as Wi-Fi and Bluetooth systems, which operate in the 2.4 GHz, 5.2 GHz, and 5.8 GHz frequency bands.

An antenna is an essential component in the field of wireless communication. If the antenna used for receiving or transmitting signals has insufficient bandwidth, it may easily cause a decline in the communication quality of mobile devices. Therefore, designing compact and wideband antenna components is an important challenge for antenna designers.

SUMMARY OF THE DISCLOSURE

In a preferred embodiment, the present disclosure provides an antenna structure including: a ground element providing a ground potential; a first radiation element having a feeding point; a second radiation element coupled to the feeding point; a capacitive element; a third radiation element coupled to the second radiation element through the capacitive element; a tunable circuit providing a variable impedance value according to a control signal; a fourth radiation element coupled to the ground element through the tunable circuit, wherein the fourth radiation element is adjacent to the first radiation element; a fifth radiation element coupled to the fourth radiation element; and a nonconductive support element having a first surface and a second surface opposite to each other, wherein the first radiation element, the second radiation element, the capacitive element, the third radiation element, and the fourth radiation element are disposed on the first surface of the nonconductive support element, and the fifth radiation element is disposed on the second surface of the nonconductive support element.

In some embodiments, the ground element and the tunable circuit are disposed on the first surface or the second surface of the nonconductive support element.

In some embodiments, the combination of the second radiation element, the capacitive element, and the third radiation element forms a Z-shape.

In some embodiments, the capacitive element is implemented by a lumped capacitor or a distributed capacitor.

In some embodiments, the capacitance value of the capacitive element ranges from 0.1 pF to 8.2 pF.

In some embodiments, the tunable circuit includes: a first capacitor coupled to the ground potential; a second capacitor coupled to the ground potential; a third capacitor coupled to the ground potential; and a switch coupled to the fourth radiation element, wherein the switch element is switched between the first capacitor, the second capacitor, and the third capacitor according to the control signal.

In some embodiments, the capacitance value of the first capacitor ranges from 8.2 pF to 27 pF.

In some embodiments, the capacitance value of the second capacitor ranges from 2.8 pF to 8.2 pF.

In some embodiments, the capacitance value of the third capacitor ranges from 1 pF to 2.8 pF.

In some embodiments, the tunable circuit includes: a first capacitor coupled to the ground potential; a second capacitor coupled to the ground potential; an open-circuit path coupled to the ground potential; and a switch coupled to the fourth radiation element, wherein the switch element is switched between the first capacitor, the second capacitor, and the open-circuit path according to the control signal.

In some embodiments, the fourth radiation element forms a longer L-shape, while the fifth radiation element forms a shorter L-shape.

In some embodiments, a coupling gap is formed between the first radiation element and the fourth radiation element, and the width of the coupling gap ranges from 0.2 mm to 1 mm.

In some embodiments, the fifth radiation element is adjacent to the capacitive element.

In some embodiments, the fifth radiation element has a vertical projection on the first surface of the nonconductive support element, and the vertical projection at least partially overlaps with the capacitive element.

In some embodiments, the antenna structure covers a first frequency band, a second frequency band, a third frequency band, and a fourth frequency band.

In some embodiments, the first frequency band ranges from 617 MHz to 960 MHz, the second frequency band ranges from 1427 MHz to 1610 MHz, the third frequency band ranges from 1710 MHz to 2690 MHz, and the fourth frequency band ranges from 3300 MHz to 6000 MHz.

In some embodiments, the length of the first radiation element is approximately equal to 0.25 wavelength of the fourth frequency band.

In some embodiments, the total length of the second radiation element and the third radiation element ranges from 0.125 to 0.25 wavelength of the second frequency band.

In some embodiments, the length of the third radiation element is approximately equal to 0.125 wavelength of the third frequency band.

In some embodiments, the total length of the fourth radiation element and the fifth radiation element ranges from 0.125 to 0.25 wavelength of the first frequency band.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
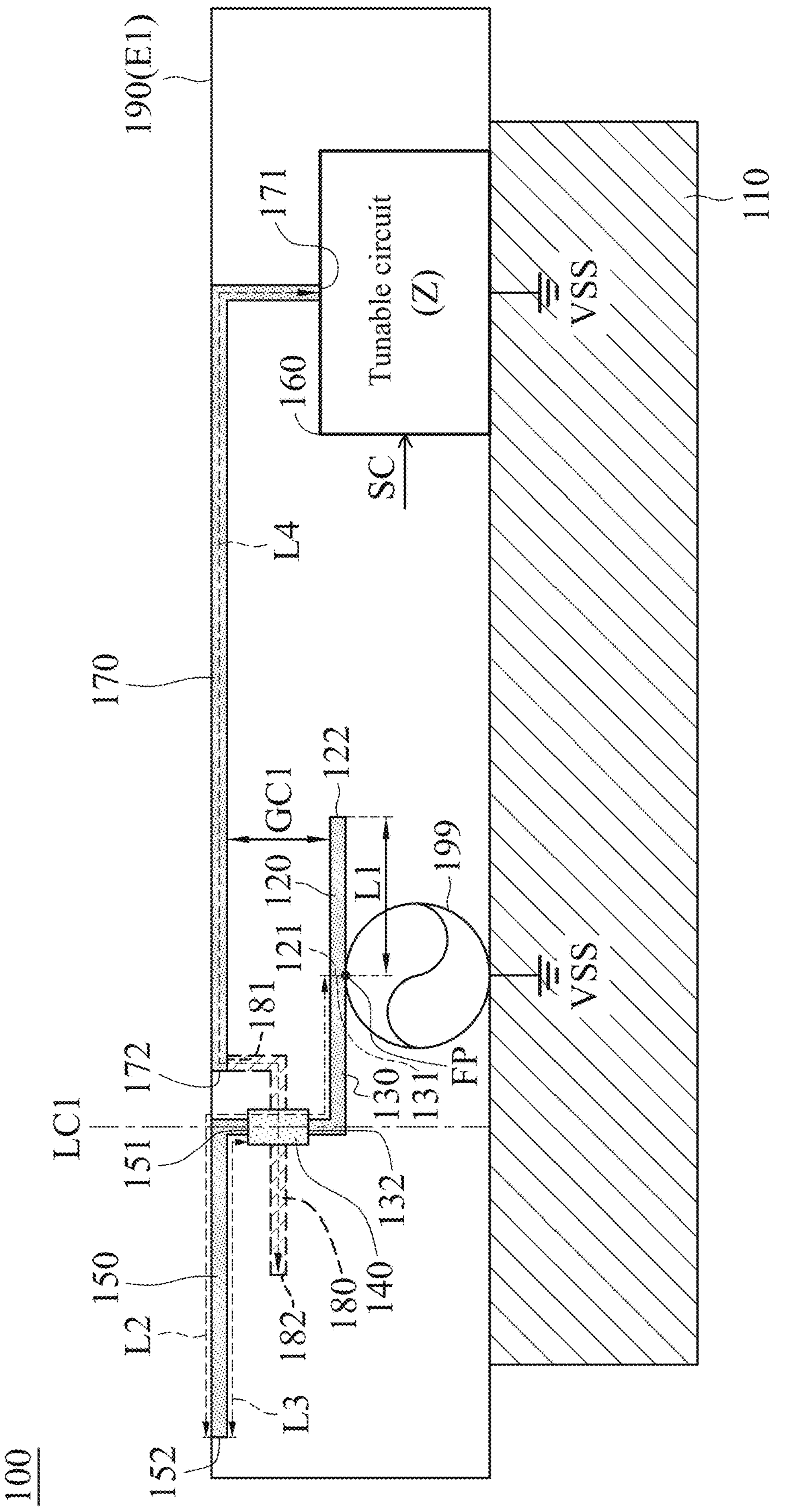
FIG. 1 is a top view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The term "approximate" or "roughly" refers to the acceptable range of error within which a person having ordinary skill in the art can address the technical issues and achieve the fundamental technical effect. Furthermore, the term "couple" in the present disclosure includes any direct and indirect means of electrical connection. Therefore, if the disclosure describes a first device coupled to a second device, it means that the first device can be directly electrically connected to the second device or indirectly electrically connected to the second device through other devices or connection means.

Figure 2:
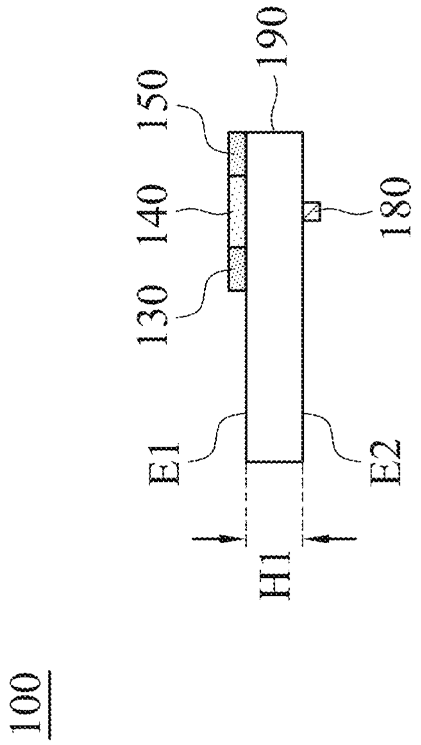
FIG. 2 is a cross-sectional view of the antenna structure according to an embodiment of the present disclosure.

FIG. 1 is a top view of an antenna structure 100 according to an embodiment of the present disclosure. FIG. 2 is a cross-sectional view of the antenna structure 100 (along a sectional line LC1 in FIG. 1). Please refer to FIGS. 1 and 2 together. The antenna structure 100 can be applied to a mobile device, such as a smartphone, tablet computer, or notebook computer. As shown in FIGS. 1 and 2, the antenna structure 100 includes: a ground element 110, a first radiation element 120, a second radiation element 130, a capacitive element 140, a third radiation element 150, a tunable circuit 160, a fourth radiation element 170, a fifth radiation element 180, and a nonconductive support element 190. The ground element 110, the first radiation element 120, the second radiation element 130, the third radiation element 150, the fourth radiation element 170, and the fifth radiation element 180 may all be made of metallic materials such as copper, silver, aluminum, iron, or alloys thereof.

The ground element 110 may be implemented by a ground copper foil. In some embodiments, the ground element 110 provides a ground voltage VSS and may be further coupled to a system ground plane of the antenna structure 100 (not shown).

For example, the first radiation element 120 may substantially take the form of a straight strip. Specifically, the first radiation element 120 has a first end 121 and a second end 122, where a feeding point FP is located at the first end 121 of the first radiation element 120, and the second end 122 of the first radiation element 120 is an open end. The feeding point FP can further be coupled to a positive electrode of a signal source 199, while the negative electrode of the signal source 199 can be coupled to the ground element 110. For instance, the signal source 199 may be a radio frequency (RF) module used to excite the antenna structure 100.

For example, the second radiation element 130 may substantially take the form of an L-shape or another straight strip. Specifically, the second radiation element 130 has a first end 131 and a second end 132, where the first end 131 of the second radiation element 130 is coupled to the feeding point FP, and the second end 132 of the second radiation element 130 is coupled to one end of the capacitive element 140. In some embodiments, the first radiation element 120 and the second radiation element 130 may be substantially aligned along the same straight line.

The type and form of the capacitive element 140 are not particularly limited in the present disclosure. In some embodiments, the capacitive element 140 may be implemented as a lumped capacitor. In other embodiments, the capacitive element 140 may be implemented as a distributed capacitor.

For example, the third radiation element 150 may substantially take the form of another L-shape. Specifically, the third radiation element 150 has a first end 151 and a second end 152, where the first end 151 of the third radiation element 150 is coupled to the other end of the capacitive element 140, and the second end 152 of the third radiation element 150 is an open end. In other words, the third radiation element 150 is coupled to the second radiation element 130 through the capacitive element 140. In some embodiments, the combination of the second radiation element 130, the capacitive element 140, and the third radiation element 150 may substantially form a Z-shape. In some embodiments, the second end 122 of the first radiation element 120 and the second end 152 of the third radiation element 150 may extend in opposite and mutually divergent directions.

The tunable circuit 160 is coupled to the ground potential VSS. In some embodiments, the tunable circuit 160 can provide a variable impedance value Z according to a control signal SC. For example, the control signal SC may be generated by a processor based on a user input (not shown), but is not limited thereto.

For example, the fourth radiation element 170 may substantially take the form of a longer L-shape. Specifically, the fourth radiation element 170 has a first end 171 and a second end 172, where the first end 171 of the fourth radiation element 170 is coupled to the tunable circuit 160. In other words, the fourth radiation element 170 is coupled to the ground element 110 through the tunable circuit 160. In some embodiments, the fourth radiation element 170 is adjacent to the first radiation element 120, and a coupling gap GC1 may be formed between the first radiation element 120 and the fourth radiation element 170. It should be noted that the term "adjacent" or "neighboring" as used in this specification may refer to a spacing between two corresponding elements being less than a predetermined distance (e.g., 10 mm or shorter), but typically does not include the situation where the two elements are in direct contact (i.e., the spacing reduced to zero).

For example, the fifth radiation element 180 may substantially take the form of a shorter L-shape (compared to the fourth radiation element 170). Specifically, the fifth radiation element 180 has a first end 181 and a second end 182, where the first end 181 of the fifth radiation element 180 is coupled to the second end 172 of the fourth radiation element 170, and the second end 182 of the fifth radiation element 180 is an open end. In some embodiments, the fifth radiation element 180 is adjacent to the capacitive element 140, where the second end 182 of the fifth radiation element 180 may extend across the capacitive element 140. In some embodiments, the second end 152 of the third radiation element 150 and the second end 182 of the fifth radiation element 180 may extend substantially in the same direction.

The nonconductive support element 190 may be made of a plastic material, and its shape and configuration are not particularly limited in the present disclosure. For example, the nonconductive support element 190 may be implemented as a plastic partition element. Alternatively, the nonconductive support element 190 may be implemented as a printed circuit board (PCB) or a flexible printed circuit (FPC). Specifically, the nonconductive support element 190 has a first surface E1 and a second surface E2 that are opposite to each other. The first radiation element 120, the second radiation element 130, the capacitive element 140, the third radiation element 150, and the fourth radiation element 170 may all be disposed on the first surface E1 of the nonconductive support element 190, while the fifth radiation element 180 may be disposed on the second surface E2 of the nonconductive support element 190. On the other hand, the ground element 110 and the tunable circuit 160 may be optionally disposed on either the first surface (E1) or the second surface (E2) of the nonconductive support element 190. It should be understood that since both the fourth radiation element 170 and the fifth radiation element 180 extend to the same edge of the nonconductive support element 190, they can be easily coupled to each other. In some embodiments, the fifth radiation element 180 has a vertical projection on the first surface E1 of the nonconductive support element 190, and the vertical projection at least partially overlaps with the capacitive element 140. In other embodiments, the antenna structure 100 may further include a conductive via element that penetrates through the nonconductive support element 190 (not shown) in which the fifth radiation element 180 may be coupled to the fourth radiation element 170 through the conductive via element.

Figure 3:
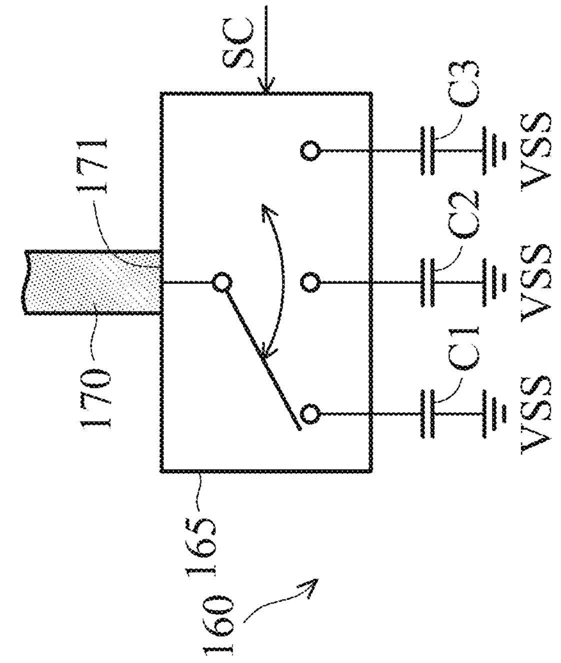
FIG. 3 is a schematic diagram of a tunable circuit according to an embodiment of the present disclosure.

FIG. 3 is a schematic diagram of the tunable circuit 160 according to an embodiment of the present disclosure. In the embodiment shown in FIG. 3, the tunable circuit 160 includes a switch element 165, a first capacitor C1, a second capacitor C2, and a third capacitor C3. The first capacitor C1, second capacitor C2, and third capacitor C3 have different capacitance values, but they are all coupled to the ground potential VSS. Specifically, one end of the switch element 165 is coupled to the first end 171 of the fourth radiation element 170, while the other end of the switch element 165 is switched between the first capacitor C1, the second capacitor C2, and the third capacitor C3 according to the control signal SC. That is, if the tunable circuit 160 uses the switch element 165 to select one of the first capacitor C1, the second capacitor C2, or the third capacitor C3, the fourth radiation element 170 will be coupled to the ground potential VSS through the selected capacitor. In some embodiments, the capacitance value of the first capacitor C1 is greater than that of the second capacitor C2, and the capacitance value of the second capacitor C2 is greater than that of the third capacitor C3, but it is not limited thereto.

Figure 4:
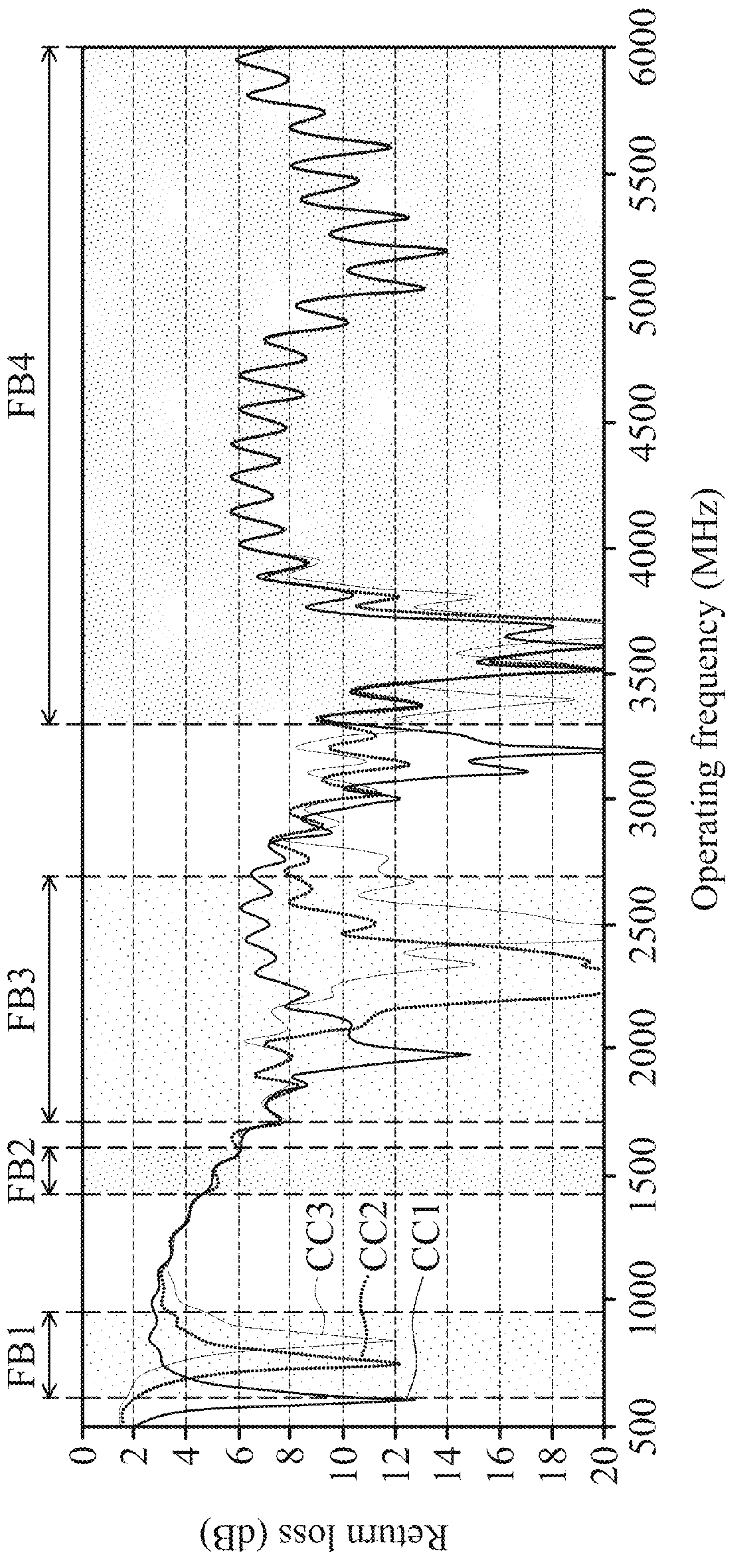
FIG. 4 is a diagram of return loss of the antenna structure according to an embodiment of the present disclosure.

FIG. 4 is a diagram of return loss of the antenna structure 100 according to an embodiment of the present disclosure, where the horizontal axis represents the operating frequency (MHz), and the vertical axis represents the return loss (dB). As shown in FIG. 4, a first curve CC1 represents the operational characteristics of the antenna structure 100 when the switch 165 of the tunable circuit 160 switches to the first capacitor C1. A second curve CC2 represents the operational characteristics when the switch 165 switches to the second capacitor C2. A third curve CC3 represents the operational characteristics when the switch 165 switches to the third capacitor C3. According to the measurement results shown in FIG. 4, the antenna structure 100 can cover a first frequency band FB1, a second frequency band FB2, a third frequency band FB3, and a fourth frequency band FB4. For example: The first frequency band FB1 ranges from 617 MHz to 960 MHz. The second frequency band FB2 ranges from 1427 MHz to 1610 MHz. The third frequency band FB3 ranges from 1710 MHz to 2690 MHz. The fourth frequency band FB4 ranges from 3300 MHz to 6000 MHz. Therefore, the antenna structure 100 can at least support wideband operations of Global Positioning System (GPS) and Long Term Evolution (LTE).

In some embodiments, the operational principle of the antenna structure 100 may be described as follows. The first radiation element 120 and the second radiation element 130 may excite the fourth frequency band FB4. The second radiation element 130, the capacitive element 140, and the third radiation element 150 may excite the second frequency band FB2 and the third frequency band FB3. The fourth radiation element 170 and the fifth radiation element 180 may excite the first frequency band FB1. Additionally, the tunable circuit 160 may further enhance the bandwidth of the first frequency band FB1.

Figure 5:
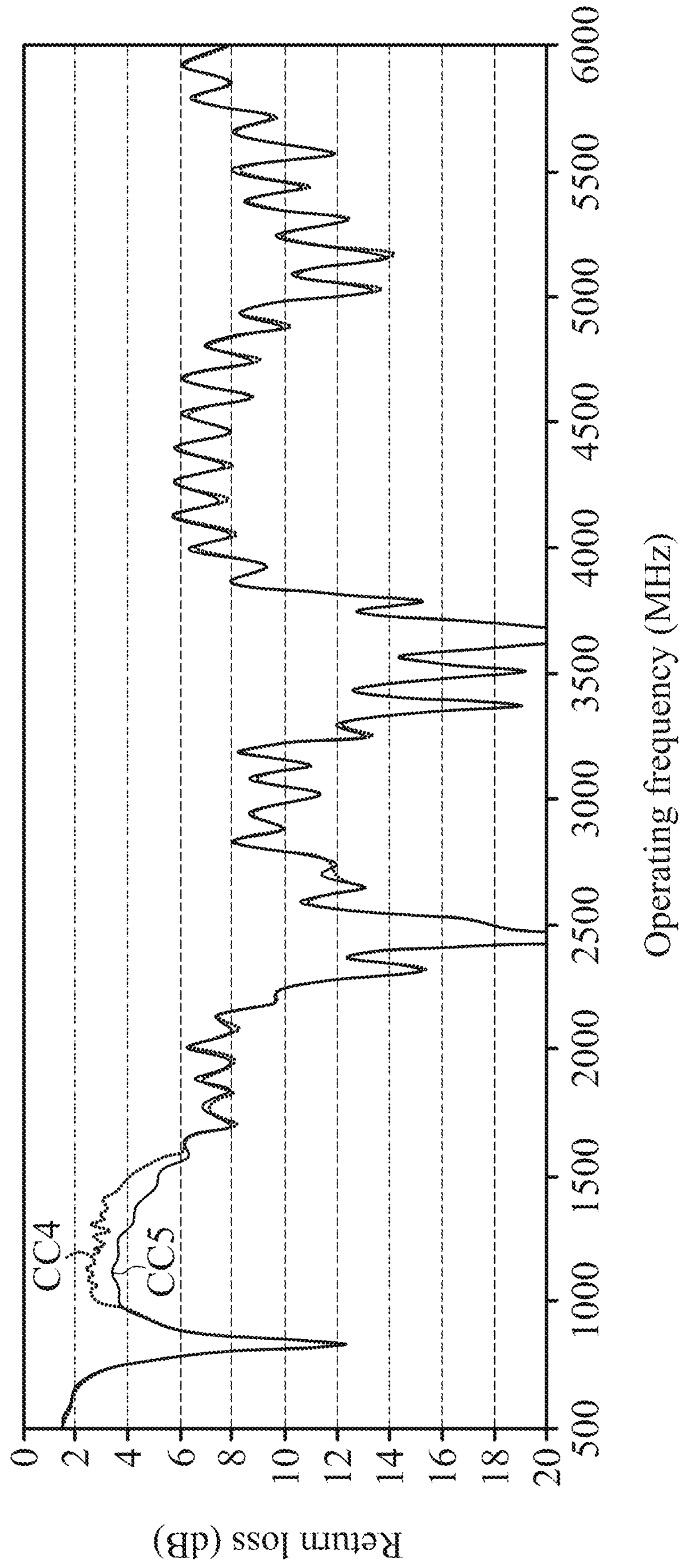
FIG. 5 is a diagram of return loss of the antenna structure according to an embodiment of the present disclosure.

FIG. 5 is a diagram of return loss of the antenna structure 100 according to an embodiment of the present disclosure, where the horizontal axis represents the operating frequency (MHz), and the vertical axis represents the return loss (dB). As shown in FIG. 5: A fourth curve CC4 represents the operational characteristics of the antenna structure 100 when the capacitive element 140 is not used. A fifth curve CC5 represents the operational characteristics when the capacitive element 140 is used. According to the comparison results shown in FIG. 5, it can be seen that the proposed capacitive element 140 helps to improve the impedance matching of the antenna structure 100 within the second frequency band FB2. Furthermore, if the fifth radiation element 180 and the capacitive element 140 partially overlap, the stability of the antenna structure 100 can be further enhanced. It should be noted that regardless of the switching operation of the tunable circuit 160, the antenna structure 100 of the present disclosure is capable of covering the required GPS frequency band.

In some embodiments, the component dimensions and parameters of the antenna structure 100 may be as follows: The length L1 of the first radiation element 120 may be approximately equal to 0.25 wavelength (λ/4) of the fourth frequency band FB4 of the antenna structure 100. The total length L2 of the second radiation element 130 and the third radiation element 150 may range from 0.125 to 0.25 wavelength (λ/8 to λ/4) of the second frequency band FB2 of the antenna structure 100. It should be understood that, due to the relatively small size of the capacitive element 140, its length can be considered negligible. The length L3 of the third radiation element 150 may be approximately equal to 0.125 wavelength (λ/8) of the third frequency band FB3 of the antenna structure 100. The total length L4 of the fourth radiation element 170 and the fifth radiation element 180 may range from 0.125 to 0.25 wavelength (λ/8 to λ/4) of the first frequency band FB1 of the antenna structure 100. The thickness H1 of the nonconductive support element 190 may range from 0.6 mm to 3 mm. The width of the coupling gap GC1 may range from 0.2 mm to 1 mm. The capacitance value of the capacitive element 140 may range from 0.1 pF to 8.2 pF. The capacitance value of the first capacitor C1 may range from 8.2 pF to 27 pF. The capacitance value of the second capacitor C2 may range from 2.8 pF to 8.2 pF. The capacitance value of the third capacitor C3 may range from 1 pF to 2.8 pF. The ranges of the component dimensions and parameters described above are derived from multiple experimental results, which help optimize the operational bandwidth and impedance matching of the antenna structure 100 while simultaneously enhancing the operational flexibility of the tunable circuit 160.

The following embodiments will introduce different configurations and detailed structural features of the antenna structure 100. It should be understood that these figures and descriptions are merely exemplary and are not intended to limit the scope of the present disclosure.

Figure 6:
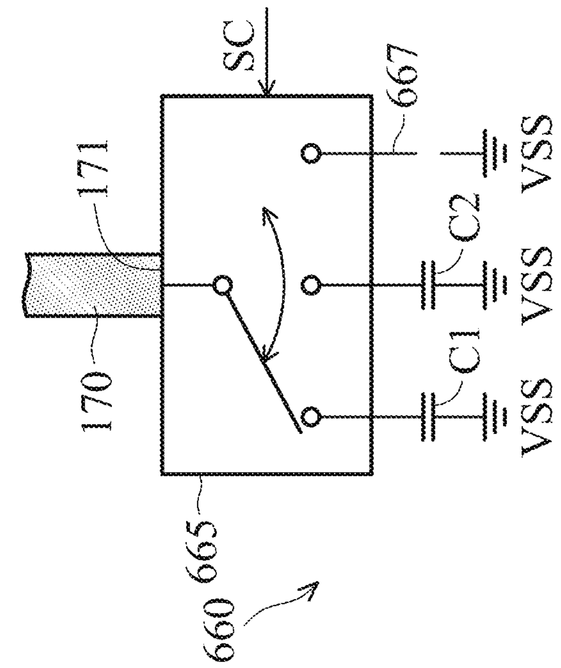
FIG. 6 is a schematic diagram of a tunable circuit according to another embodiment of the present disclosure.

FIG. 6 is a schematic diagram of a tunable circuit 660 according to another embodiment of the present disclosure. In the embodiment shown in FIG. 6, the tunable circuit 660 includes a switch 665, a first capacitor C1, a second capacitor C2, and an open-circuited path 667. The first capacitor C1, the second capacitor C2, and the open-circuited path 667 are all coupled to the ground potential VSS. For example, the open-circuited path 667 may be regarded as a resistor having an infinite resistance value. Specifically, one end of the switch 665 is coupled to the first end 171 of the fourth radiation element 170, while the other end of the switch 665 switches among the first capacitor C1, the second capacitor C2, and the open-circuited path 667 according to the control signal SC. That is, if the tunable circuit 660 utilizes the switch 665 to select one of the first capacitor C1, the second capacitor C2, or the open-circuited path 667, the fourth radiation element 170 can be coupled to the ground potential VSS through the selected capacitor or path. According to actual measurement results, when the tunable circuit 660 is applied to the aforementioned antenna structure 100, the antenna structure 100 can also support wideband operations of GPS and LTE.

The present disclosure proposes a novel antenna structure. Compared with conventional designs, the present disclosure at least offers advantages such as compact size, wide bandwidth, and excellent circuit integration, making it highly suitable for application in various types of mobile communication devices.

It should be noted that the component dimensions, component shapes, component parameters, and frequency ranges described above are not intended to be limiting to the present disclosure. Antenna designers may adjust these settings according to different requirements. The antenna structure of the present disclosure is not limited to the configurations shown in FIGS. 1 to 6. The present disclosure may include any one or a combination of features from any one or more embodiments depicted in FIGS. 1 to 6. In other words, not all features shown in the diagrams are necessarily implemented simultaneously in the antenna structure of the present disclosure.

In this specification and the claims, ordinal numbers such as "first," "second," "third," etc., do not imply any sequential order. They are only used to distinguish between different elements with the same name.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure comprising:

a ground element, providing a ground potential;

a first radiation element, having a feeding point;

a second radiation element, coupled to the feeding point;

a capacitive element;

a third radiation element, coupled through the capacitive element to the second radiation element;

a tunable circuit, providing a variable impedance value according to a control signal;

a fourth radiation element, coupled through the tunable circuit to the ground element, wherein the fourth radiation element is adjacent to the first radiation element;

a fifth radiation element, coupled to the fourth radiation element; and a nonconductive support element, having a first surface and a second surface opposite to each other, wherein the first radiation element, the second radiation element, the capacitive element, the third radiation element, and the fourth radiation element are disposed on the first surface of the nonconductive support element, and the fifth radiation element is disposed on the second surface of the nonconductive support element.

2. The antenna structure of claim 1, wherein the ground element and the tunable circuit are disposed on the first surface or the second surface of the nonconductive support element.

3. The antenna structure of claim 1, wherein a combination of the second radiation element, the capacitive element, and the third radiation element substantially has a Z-shape.

4. The antenna structure of claim 1, wherein the capacitive element is implemented with a lumped capacitor or a distributed capacitor.

5. The antenna structure of claim 1, wherein a capacitance of the capacitive element ranges from 0.1 pF to 8.2 pF.

6. The antenna structure of claim 1, wherein the tunable circuit comprises:

a first capacitor, coupled to the ground potential;
a second capacitor, coupled to the ground potential;
a third capacitor, coupled to the ground potential; and
a switch element, coupled to the fourth radiation element, wherein the switch element is switched between the first capacitor, the second capacitor, and the third capacitor according to the control signal.

7. The antenna structure of claim 6, wherein a capacitance of the first capacitor is from 8.2 pF to 27 pF.

8. The antenna structure of claim 6, wherein a capacitance of the second capacitor is from 2.8 pF to 8.2 pF.

9. The antenna structure of claim 6, wherein a capacitance of the third capacitor is from 1 pF to 2.8 pF.

10. The antenna structure of claim 1, wherein the tunable circuit comprises:

a first capacitor, coupled to the ground potential;
a second capacitor, coupled to the ground potential;
an open-circuit path, coupled to the ground potential; and
a switch element, coupled to the fourth radiation element, wherein the switch element is switched between the first capacitor, the second capacitor, and the open-circuit path according to the control signal.

11. The antenna structure of claim 1, wherein the fourth radiation element substantially has a long L-shape, and the fifth radiation element substantially has a short L-shape.

12. The antenna structure of claim 1, wherein a coupling gap is formed between the first radiation element and the fourth radiation element, and a width of the coupling gap ranges from 0.2 mm to 1 mm.

13. The antenna structure of claim 1, wherein the fifth radiation element is adjacent to the capacitive element.

14. The antenna structure of claim 1, wherein the fifth radiation element has a vertical projection on the first surface of the nonconductive support element, and the vertical projection at least partially overlaps the capacitive element.

15. The antenna structure of claim 1, wherein the antenna structure covers a first frequency band, a second frequency band, a third frequency band, and a fourth frequency band.

16. The antenna structure of claim 15, wherein the first frequency band is from 617 MHz to 960 MHz, the second frequency band is from 1427 MHz to 1610 MHz, the third frequency band is from 1710 MHz to 2690 MHz, and the fourth frequency band is from 3300 MHz to 6000 MHz.

17. The antenna structure of claim 15, wherein a length of the first radiation element is substantially equal to 0.25 wavelength of the fourth frequency band.

18. The antenna structure of claim 15, wherein a total length of the second radiation element and the third radiation element is from 0.125 to 0.25 wavelength of the second frequency band.

19. The antenna structure of claim 15, wherein a length of the third radiation element is substantially equal to 0.125 wavelength of the third frequency band.

20. The antenna structure of claim 15, wherein a total length of the fourth radiation element and the fifth radiation element is from 0.125 to 0.25 wavelength of the first frequency band.

* * * * *